(12) United States Patent
Kim

(10) Patent No.: US 11,320,001 B2
(45) Date of Patent: May 3, 2022

(54) STRUCTURE FOR LUBRICATING CLUTCH

(71) Applicant: Hyundai Transys Inc., Seosan-si (KR)

(72) Inventor: Tae Hoon Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 16/951,547

(22) Filed: Nov. 18, 2020

(65) Prior Publication Data

US 2021/0317881 A1     Oct. 14, 2021

(30) Foreign Application Priority Data

Apr. 8, 2020 (KR) .................. 10-2020-0042614

(51) Int. Cl.
*F16D 13/74* (2006.01)
*F16H 57/04* (2010.01)
*B60K 6/38* (2007.10)

(52) U.S. Cl.
CPC ......... *F16D 13/74* (2013.01); *F16H 57/0428* (2013.01); *F16H 57/0473* (2013.01); *B60K 6/38* (2013.01); *B60Y 2200/92* (2013.01)

(58) Field of Classification Search
CPC ... F16D 13/74; F16H 57/0428; F16H 57/0473
See application file for complete search history.

(56) References Cited

FOREIGN PATENT DOCUMENTS

| JP | 2004044723 A | * | 2/2004 |
| JP | 2008082467 A | * | 4/2008 |
| KR | 10-2009-0037730 A | | 4/2009 |

\* cited by examiner

*Primary Examiner* — Huan Le
(74) *Attorney, Agent, or Firm* — Novick, Kim & Lee, PLLC; Jae Youn Kim; Jihun Kim

(57) ABSTRACT

Provided is a structure for lubricating a clutch, the structure including: an oil capturing groove provided along an inner circumference of a ring gear at one side of a pinion gear; and an oil hole connected to an inside of a clutch hub through the oil capturing groove.

5 Claims, 3 Drawing Sheets

STRUCTURE FOR LUBRICATING CLUTCH

CROSS-REFERENCE TO RELATED APPLICATIONS

This application claims priority to and the benefit of Korean Patent Application No. 10-2020-0042614 filed in the Korean Intellectual Property Office on Apr. 8, 2020, the entire contents of which are incorporated herein by reference.

TECHNICAL FIELD

The present invention relates to a structure for lubricating a clutch.

BACKGROUND ART

In general, a hybrid vehicle refers to a vehicle driven by an efficient combination of two or more different types of power sources. The hybrid vehicle typically uses the engine and the motor-generator. The hybrid vehicle uses the motor-generator, as a main power source, which has relatively good low-speed torque characteristics, at a low speed, and uses the engine, as a main power source, which has relatively good high-speed torque characteristics, at a high speed. Therefore, in a low-speed section, the hybrid vehicle uses the motor-generator while stopping the operation of the engine that uses fossil fuel, and thus the hybrid vehicle has an excellent effect of improving fuel economy and reducing exhaust gas.

A power transmission apparatus for a hybrid vehicle in the related art includes a planetary gear set, a plurality of motor-generators which is used as motors and electric generators, a torque transmission mechanism which may control rotary elements of the planetary gear set, and a battery which is used as a power source for the motor-generator. The planetary gear set includes a sun gear, a carrier engaging with an outer circumference of the sun gear and configured to support a rotation of pinions, and a ring gear engaging, at an inner circumference thereof, with the pinions.

FIG. 1 is a view illustrating a structure for lubricating a clutch in the related art. As illustrated in FIG. 1, in the related art, in order to lubricate a clutch including a clutch hub 2a and clutch discs 2b disposed outside a ring gear 1, oil O scattered from a pinion gear 3 is distributed to one side and the other side of the pinion gear 3 positioned inside the ring gear 1, as indicated by the arrow illustrated in FIG. 1.

However, in the related art, when the oil is distributed to one side and the other side of the pinion gear based on a center of the pinion gear, only oil, which is discharged to the other side of the pinion gear, is used to lubricate the clutch. For this reason, the amount of lubrication of the clutch is inevitably insufficient.

In this regard, the present invention suggests a mechanism, in which an oil hole is provided in a ring gear and connected to an oil capturing groove and a clutch hub, thereby increasing the amount of lubrication of a clutch.

DOCUMENT OF RELATED ART

Patent Document (Patent Document 1) Korean Patent Application Laid-Open No. 10-2009-0037730 (published on Apr. 16, 2009)

SUMMARY OF THE INVENTION

The present invention has been made in an effort to provide a structure for lubricating a clutch, in which an oil hole is provided in a ring gear and connected to an oil capturing groove and a clutch hub, thereby increasing the amount of lubrication of the clutch.

An exemplary embodiment of the present invention provides a structure for lubricating a clutch, the structure including: an oil capturing groove provided along an inner circumference of a ring gear at one side of a pinion gear; and an oil hole connected to an inside of a clutch hub through the oil capturing groove.

The oil hole may include an inlet positioned at a side close to the oil capturing groove, and an outlet positioned at a side close to the clutch hub.

An oil guide groove may be provided at an inner circumference of the clutch hub.

The oil guide groove may surround the outlet of the oil hole and guide the oil passing through the outlet to the other side of the pinion gear so that the oil merges with the oil distributed to the other side of the pinion gear.

A rounded corner configured to guide a movement of the oil may be provided at one side of the oil guide groove.

The oil hole may be configured to be inclined toward the oil guide groove in a direction from the inlet to the outlet.

The clutch hub may be provided with a through hole connected to a clutch disc.

According to the present invention, the oil hole is provided in the ring gear and connected to the oil capturing groove and the clutch hub, thereby increasing the amount of lubrication of the clutch.

According to the present invention, it is possible to improve durability of the clutch by increasing the amount of lubrication.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
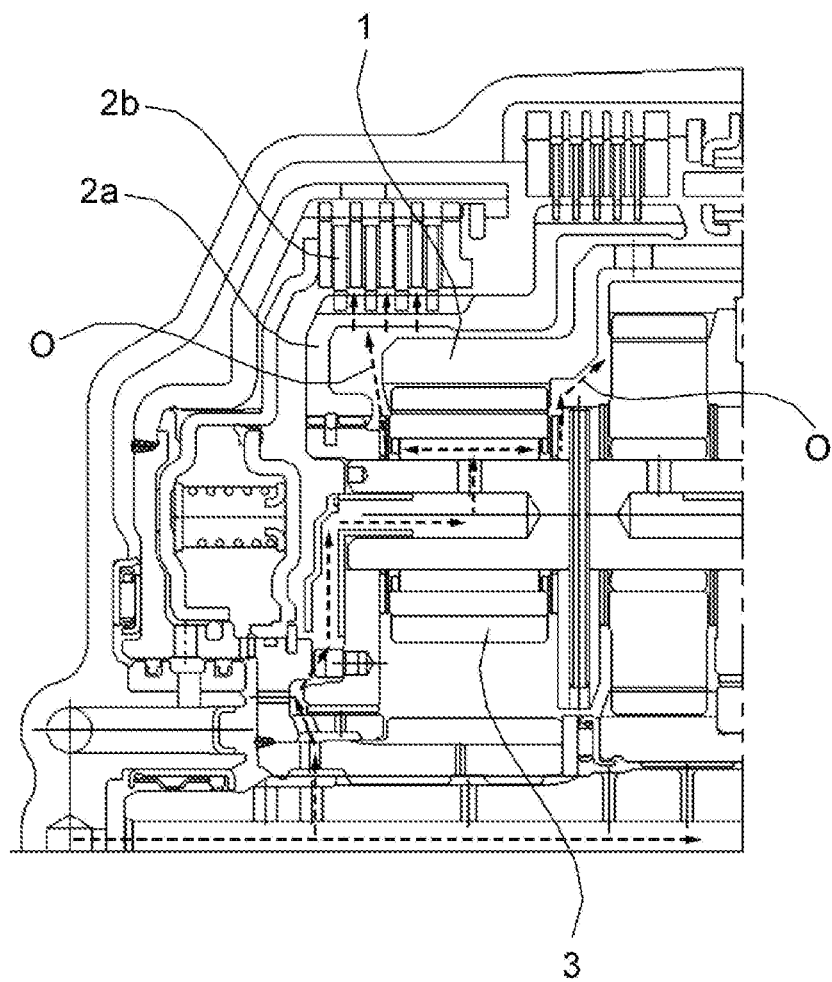
FIG. 1 is a view illustrating a structure for lubricating a clutch in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

In the related art, when oil is distributed to one side and the other side of the pinion gear based on a center of the pinion gear, only oil, which is discharged to the other side of the pinion gear, is used to lubricate the clutch. For this reason, the amount of lubrication of the clutch is inevitably insufficient. In this regard, the present invention suggests a mechanism, in which an oil hole is provided in a ring gear and connected to an oil capturing groove and a clutch hub, thereby increasing the amount of lubrication of a clutch.

Figure 2:
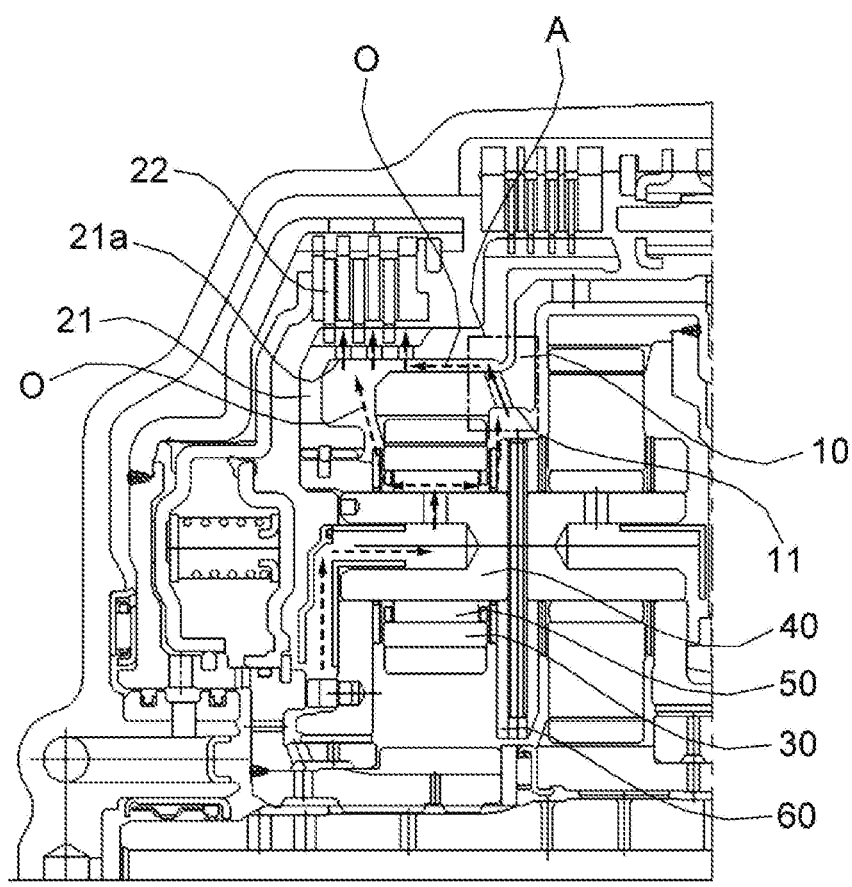
FIG. 2 is a view illustrating a structure for lubricating a clutch according to an exemplary embodiment of the present invention.
Figure 3:
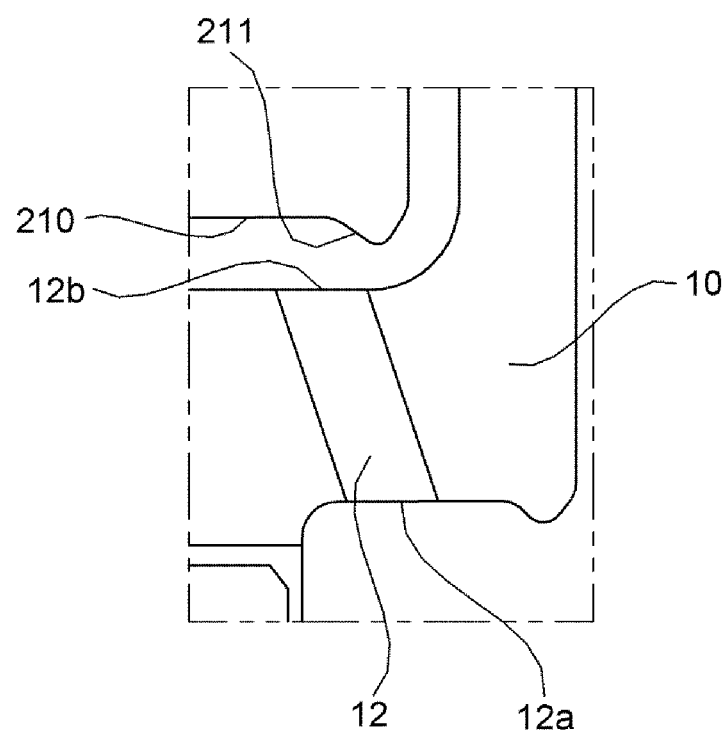
FIG. 3 is an enlarged view of part A in FIG. 2.

FIG. 2 is a view illustrating a structure for lubricating a clutch according to an exemplary embodiment of the present invention, and FIG. 3 is an enlarged view of part A in FIG. 2.

The present invention is characterized in that an oil capturing groove 11 and an oil hole 12 are formed in a ring gear 10 so as to increase the amount of lubrication by oil supplied to a clutch hub 21 and clutch discs 22. The ring gear 10 having the oil capturing groove 11 and the oil hole 12 is mounted in a housing together with the clutch hub 21 and the clutch discs 22.

Specifically, pinion gears 30 mesh with an inner portion of the ring gear 10. The oil capturing groove 11 is formed along an inner circumference of the ring gear 10 at one side of the pinion gear 30. The oil capturing groove 11 is recessed to make it easy to capture the oil.

The oil scattered from the pinion gear 30 is distributed toward one side and the other side of the pinion gear 30. Oil 0 distributed to one side of the pinion gear 30 is captured in the oil capturing groove 11 of the ring gear 10.

The oil captured in the oil capturing groove 11 is supplied into the clutch hub 21 through the oil hole 12. The oil hole 12 is connected to the inside of the clutch hub 21 through the oil capturing groove 11.

The oil hole 12 includes an inlet 12a into which the oil is introduced, and an outlet 12b from which the oil is discharged. The inlet 12a is positioned at a side close to the oil capturing groove 11, and the outlet 12b is positioned at a side close to the clutch hub 21.

The oil hole 12 is formed in the form of an inclined hole inclined from the inlet 12a toward the outlet 12b.

Since the oil hole 12 is inclined from the inlet 12a toward the outlet 12b as described above, the oil passing through the outlet 12b may naturally move toward the clutch disc 22.

An oil guide groove 210 is provided in an inner circumference of the clutch hub 21. The oil guide groove 210 is formed to surround the outlet 12b of the oil hole 12. The oil guide groove 210 includes a rounded corner 211.

The oil, which is scattered from the pinion gear 30 and distributed to one side of the pinion gear 30, is captured in the oil capturing groove 11 and introduced into the inlet 12a of the oil hole 12. The oil introduced into the inlet 12a of the oil hole 12 is discharged into the clutch hub 21 through the outlet 12b of the oil hole 12.

The oil discharged from the outlet 12b of the oil hole 12 is guided by the oil guide groove 210 and naturally merges with the oil distributed to the other side of the pinion gear 30. Since the oil discharged from the outlet 12b of the oil hole 12 merges with the oil distributed to the other side of the pinion gear 30 as described above, it is possible to maximize the amount of lubrication by the oil supplied to the clutch hub 21 and the clutch disc 22.

The rounded corner 211 provided at one side of the oil guide groove 210 serves to guide the oil discharged from the outlet 12b of the oil hole 12, such that the oil may move toward the clutch disc 22 and merge with the oil distributed to the other side of the pinion gear 30.

The clutch hub 21 has a through hole 21a. The through hole 21a is provided at a position corresponding to the clutch disc 22. The through hole 21a is provided in the clutch hub 21 and connected to the clutch disc 22. The oil in the clutch hub 21 may move to the clutch disc 22 through the through hole 21a.

The oil discharged from the outlet 12b of the oil hole 12 and the oil distributed to the other side of the pinion gear 30 merge with each other and then is supplied to the clutch disc 22 through the through hole 21a.

Next, a process of moving the oil in the structure for lubricating a clutch according to the present invention will be described more specifically.

The oil distributed to one side and the other side of the pinion gear 30 by the operation of the pinion gear 30 is moved as indicated by the arrows illustrated in FIG. 2.

Specifically, as illustrated in FIGS. 2 and 3, the oil is supplied to the pinion gear 30 through a pinion shaft 40 on which the pinion gears 30 are axially installed. The pinion gear 30 may be axially installed on the pinion shaft 40 by a roller bearing 50.

The oil supplied to the pinion gear 30 is distributed to one side and the other side of the pinion gear 30 by the operation of the pinion gear 30.

The oil O distributed to one side of the pinion gear 30 is captured in the oil capturing groove 11 and moved to the oil hole 12. A part of the oil O distributed to one side of the pinion gear 30 may be supplied to a carrier 60 positioned at one side of the pinion gear 30.

The oil is introduced into the inlet 12a of the oil hole 12 by the oil capturing groove 11, quickly passes through the inclined oil hole 12, and is discharged into the clutch hub 21 through the outlet 12b of the oil hole 12. Because the outlet 12b of the oil hole 12 is directed toward the oil guide groove 210, the oil discharged from the outlet 12b of the oil hole 12 may be discharged accurately toward the oil guide groove 210.

The oil O discharged into the clutch hub 21 moves to the other side of the pinion gear 30 along the oil guide groove 210 surrounding the outlet 12b of the oil hole 12, and then merges with the oil O distributed to the other side of the pinion gear 30.

The oil discharged from the outlet 12b of the oil hole 12 may be smoothly moved to the other side of the pinion gear 30 by the rounded corner 211 of the guide groove 210.

The oil discharged from the outlet 12b of the oil hole 12 and the oil O distributed to the other side of the pinion gear 30 merge with each other and then is supplied to the clutch disc 22 through the through hole 21a.

In the state in which the amount of lubrication is increased as the oil discharged from the outlet 12b of the oil hole 12 and the oil O distributed to the other side of the pinion gear 30 merge with each other, the oil is supplied to the clutch disc 22. Accordingly, it is possible to improve performance of the clutch discs 22 by increasing the amount of lubrication of the clutch discs 22 which is insufficient in the related art.

As described above, according to the present invention, the oil hole is provided in the ring gear and connected to the oil capturing groove and the clutch hub, thereby increasing the amount of lubrication of the clutch. In addition, according to the present invention, it is possible to improve durability of the clutch by increasing the amount of lubrication.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit within the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A structure for lubricating a clutch, the structure comprising:
    an oil capturing groove provided along an inner circumference of a ring gear at one side of a pinion gear; and
    an oil hole connected to an inside of a clutch hub through the oil capturing groove,
    wherein an oil guide groove having a rounded corner at one side of the oil guide groove is provided at an inner circumference of the clutch hub,
    wherein the oil hole comprises an inlet and an outlet, and
    wherein the oil hole is configured to be angled toward the oil guide groove in a direction from the inlet to the outlet, such that the oil passes through the outlet in a direction away from the rounded corner.

2. The structure of claim 1,
    wherein the inlet of the oil hole is positioned at a side close to the oil capturing groove and the outlet of the oil hole is positioned at a side close to the clutch hub.

3. The structure of claim 2, wherein the oil guide groove surrounds the outlet of the oil hole and guides the oil passing through the outlet to the other side of the pinion gear so that the oil merges with the oil distributed to the other side of the pinion gear.

4. The structure of claim 2, wherein the rounded corner configured to guide a movement of the oil is provided at one side of the oil guide groove.

5. The structure of claim 2, wherein the clutch hub is provided with a through hole connected to a clutch disc.

* * * * *